United States Patent Office 2,942,040
Patented June 21, 1960

2,942,040

MANUFACTURE OF SODIUM CYCLOPENTADIENE FROM CYCLOPENTADIENE DIMER

Joseph D. Odenweller, Birmingham, and Urho A. Lehikoinen, Detroit, Mich., assignors to Ethyl Corporation, New York, N.Y., a corporation of Delaware No Drawing. Filed Sept. 18, 1957, Ser. No. 684,635

4 Claims. (Cl. 260—665)

The present invention relates to the manufacture of organometallic compounds and more particularly to the synthesis of sodium cyclopentadienyl compounds.

Cyclopentadienyl sodium compounds have been known for many years but they are now becoming of increasing importance as intermediates in the manufacture of cyclopentadienyl compounds of other metals, e.g., iron, nickel, manganese and the like. Cyclopentadienyl sodium compounds react with salts of these other metals to form the corresponding metal cyclopentadienyl compound. For example, cylopentadienyl sodium reacts with manganous chloride to form bis(cyclopentadienyl)manganese. These latter compounds are useful as additives to gasoline and other fuels, improving particularly the antiknock qualities of the gasoline. The bis(cyclopentadienyl)manganese compounds recently have been reacted with carbon monoxide (and other electron donors) to produce cyclopentadiene manganese tricarbonyl compounds which, particularly the alkyl derivatives, are exceptionally good antiknocks for gasoline.

The conventional method for producing cyclopentadienyl sodium compounds at the present time involves the reaction of sodium metal and the corresponding cyclopentadiene hydrocarbon monomer. This reaction is normally conducted in a hydrocarbon or a lower aliphatic ether solvent at temperatures usually below 50° C., i.e., below the boiling point of the monomer. Due to the tendency of these cyclopentadiene hydrocarbons to dimerize, even at moderately elevated temperatures, it is necessary to depolymerize the dimer in a vapor phase reaction at cracking temperatures, e.g., usually above about 250° C.–450° C., immediately prior to its use in the reaction. Such pretreatment is undesirable in large-scale commercial operation, since it is necessary to store or otherwise provide an adequate supply of the feed monomer under refrigerated conditions, normally at or below Dry Ice temperatures. This requirement not only increases operational and maintenance costs but materially increases the cost of a plant investment. Of course, the construction and operation of separate depolymerization equipment is also unduly costly. However, probably the greatest disadvantage of monomer use involves the danger of explosions, due to spontaneous polymerization of the monomer.

Previously, it has been proposed to employ the dimeric cyclopentadiene hydrocarbon directly in the reaction with sodium while maintaining the temperature below the boiling point of the dimer, i.e., about 160° C. At these temperatures the depolymerization rate is very slow and the small quantity of resulting low boiling monomer reacts with the sodium with little loss from the system. However, the reaction rate of this process is unduly slow for commercial use. Higher temperatures were considered unfeasible due to low boiling point of the cyclopentadienyl hydrocarbon and the tendency for the sodium to attack and destroy the solvent.

It is accordingly an object of this invention to provide an improved process for the manufacture of sodium cyclopentadienyl compounds. Another object is to provide a process which employs the cyclopentadiene dimer directly, thus limiting the difficulty and cost of a separate depolymerization step but at the same time obtaining a fast reaction with a minimum or elimination of solvent attack by the sodium. Still another object of this invention is to provide a process which is adapted to large-scale commercial operation. Other objects and advantages of the present process will be apparent from the following description and appended claims.

These and other objects of the invention are obtained if the cyclopentadiene hydrocarbon is fed directly to the reaction zone in dimeric form for reaction with liquid sodium suspended in an ethylene glycol dialkyl ether solvent medium, the temperature of the reaction being maintained between about 180° C.–195° C. It is found under these conditions that exceedingly fast reaction rates are obtained in spite of the increased volatility of the hydrocarbon reactant and at the same time virtually no hydrocarbon is lost from the reaction system with the liberated hydrogen gas. This is true even though the reaction temperature is about 150° above the boiling point of the monomer.

With regard to the rate of reaction, it is found that a temperature of about 180° C. is a critical lower operating limit. For example, even at temperatures of 178° C., the reaction requires about four hours, whereas at 185° C. it only requires 1.7 hours. It is also found that the temperature effect on reaction rate is critical only between 180° C. and 195° C. That is, at temperatures above about 195° C. no significant increase in reaction rate is encountered.

The more elevated temperatures are also undesirable for other reasons. The sodium appears to seriously attack or otherwise degrade the ether solvents at temperatures above about 195° C. This effect is also sharply dependent upon temperature. Thus, below about 190° C. there is no detectable solvent degradation. Moreover, between 190° C.–195° C. the solvent attack is negligible. However, at temperatures above 195° C. the solvent degradation is appreciable and is unsatisfactory for large-scale commercial use of the process. This solvent degradation not only affects the economics of the process due to consumption of raw materials but materially complicates product recovery and purification operations. This is illustrated by quantitative measurements of solvent degradation. At a temperature of 196° C. from 6 to 8 percent of the solvent is destroyed, resulting in the formation of undesirable, troublesome byproducts. In contrast, when the reaction is conducted at about 191° C. only about 3 percent of the solvent is destroyed, a 100–200 percent reduction of solvent attack with only a five centigrade degree temperature change. Then, as pointed out above, below 190° C. there is no detectable solvent attack.

More specifically, the process of this invention comprises suspending liquid sodium in an ethylene glycol dialkyl ether solvent at temperatures between about 180° C.–195° C., preferably between about 185° C. and 190° C., and thereafter feeding the cyclopentadiene hydrocarbon in dimeric form directly into the sodium suspension. When the reaction is conducted continuously, the hydrocarbon and sodium can be fed concurrently. Under these conditions the feed rate of the dimeric cyclopentadiene hydrocarbon can be selectively rapid without resulting in boiling or refluxing of the hydrocarbon. This is surprising since (methyl)cyclopentadiene, for example, boils at a temperature of 43° C. under atmospheric pressure. The reaction mixture is preferably agitated during the reaction to maintain a suitable state of subdivision of the sodium to assure adequate fresh sodium surface for reaction with the cyclopentadiene hydrocarbon.

The reaction can be conducted either in batch or continuous fashion. When operating continuously, the sodium can be fed as liquid to the reactor or the sodium can be pre-dispersed in a suitable solvent. It is usually convenient when employing a dispersion to use the same solvent as is employed in the reaction, although other inert media can be employed, such as hydrocarbons, amines and the like.

The following are typical examples which illustrate the process of this invention. In these examples all parts are given on a weight basis.

EXAMPLE I

A reactor equipped with a stirrer, and temperature measuring and control means, was charged with 400 parts of diethylene glycol dimethyl ether and 142 parts of sodium metal. This mixture was then heated with stirring under moderate pressure to a temperature of about 185° C. to melt and disperse the sodium. Methylcyclopentadiene dimer (545 parts) added to the hot suspension and the reaction mixture was agitated for a period of about 1.4 hours, while continuously removing hydrogen from the reactor. Virtually no methylcyclopentadiene was lost with the hydrogen gas. The yield of sodium methylcyclopentadienyl was 97.5 percent based upon the sodium charged. There was no evidence whatsoever of any attack of the sodium on the ethylene glycol dimethyl ether solvent.

The above example is contrasted with operation under identical conditions except that a temperature of 196° C. is employed. At this higher temperature 6 to 8 percent of the solvent was degraded by the sodium and gas in addition to hydrogen was evolved. At the same time this higher temperature did not increase the reaction rate. When the above reaction was conducted at a temperature of 178° C. instead of 185° C. the reaction required 4 hours to obtain essentially the same yield of the sodium methylcyclopentadienyl product.

EXAMPLE II

Example I was repeated and the product was further reacted with manganous chloride and carbon monoxide to form methylcyclopentadienyl manganese tricarbonyl. The crude reaction product of Example I was first reacted with 389.5 parts of manganous chloride at a temperature of 145° C. to 150° C. for a period of about one and a half hours, using continuous agitation. To this reaction mixture was added carbon monoxide at 50 p.s.i.g. for a period of somewhat over 1 hour, 219 parts of carbon monoxide being taken up by the reaction. To this crude mixture was added 100 parts of additional solvent and 500 parts of a 50—50 weight mixture of diphenyl and diphenyl oxide. The solvent and product were thereafter distilled and separately recovered. The product, methylcyclopentadienyl manganese tricarbonyl, was recovered in 95.4 percent yield. Virtually all of the solvent was recovered and reused in subsequent runs.

The manganese compound can be subjected to fractionation and the purified product thereafter blended with gasoline. The following Table I presents data showing the octane increase of a commercial gasoline having an initial boiling point of 94° F. and a final boiling point of 390° F. The antiknock value of the fuel as determined by the ratings are given in octane numbers for figures below 100 and in Army-Navy performance numbers for values above 100. The method of determining performance numbers is explained in the booklet "Aviation Fuels and Their Effect on Engine Performance," NAVAER-06-5-501, USAF T.O. No. 06-5-54, published in 1951.

Table I

| $C_6H_7Mn(CO)_3$, g. metal/gal. | Octane Rating |
| --- | --- |
| 0 | 83.1 |
| 1.0 | 92.7 |
| 2.0 | 95.8 |
| 3.0 | 98.0 |
| 5.0 | 102.0 |

EXAMPLE III

Example I is repeated except that cyclopentadiene dimer is reacted with sodium in 800 parts diethylene glycol diethyl ether. The temperature of the reaction is maintained at 187° C.

EXAMPLE IV

Example I is repeated except that ethylcyclopentadiene dimer is reacted under pressure with sodium using 600 parts ethylene glycol dibutyl ether as the solvent. The reaction temperature in this example was maintained between 189° C. and 192° C. Similar results are obtained except that ethylcyclopentadienyl sodium is produced.

EXAMPLE V

Example I is repeated except that phenylcyclopentadiene dimer is reacted with sodium in diethylene glycol dimethyl ether solvent at a temperature of 187° C. Similar results are obtained, except that phenylcyclopentadienyl sodium is formed instead of the methylcyclopentadienyl sodium.

Typical examples of cyclopentadienyl sodium compounds which can be made in accordance with this invention are cyclopentadienyl sodium, methylcyclopentadienyl sodium, ethylcyclopentadienyl sodium, dimethylcyclopentadienyl sodium, n-decylcyclopentadienyl sodium, phenyl cyclopentadienyl sodium and the like. The preferred cyclopentadienyl sodium compounds in accordance with this invention are compounds which contain cyclopentadienyl radicals having from 5 to 11 carbon atoms.

In general, it is preferred to use a slight excess of the cyclopentadiene compound in relation to molar equivalents of sodium, usually an excess of from 5 to 15 mole percent. However, the process can be conducted at mole ratios of from 0.5 to about 3 moles of cyclopentadiene compound per mole of sodium.

The solvents useful in the present invention are polyethers, particularly the ethylene glycol dialkyl ether types. Typical examples of monoethylene glycol dialkyl ethers are methyl methyl, methyl ethyl, ethyl ethyl, methyl butyl, ethyl butyl, butyl butyl, butyl lauryl; diethylene glycol ethers, such as methyl methyl, ethyl ethyl, ethyl butyl, butyl butyl and butyl lauryl; triethylene glycol ethers, such as dimethyl, diethyl, methyl ethyl and the like. In general, the preferred ethers have alkyl groups containing from 1 to 10 carbon atoms.

The above solvents can be used in a wide range of concentrations, i.e., from about 0.1 part per part of sodium to 100 parts per part of sodium. A more preferred concentration range is between about 1 to 10 parts of solvent per part of sodium.

At the temperatures employed in the present process, the sodium is in a liquid state. Under these conditions it is relatively easy to maintain uniform dispersion of the sodium by stirring or otherwise agitating the reaction mass. Only a moderate amount of agitation is normally necessary to obtain rapid reaction rates and in some cases violent agitation is undesirable due to a slight increase in solvent attack by the sodium.

We claim:

1. The process for the manufacture of cyclopentadienyl sodium compounds comprising feeding a cyclopentadiene dimer into a reaction medium comprising dispersed liquid sodium in an ethylene glycol dialkyl ether solvent maintained at a temperature of between about 190–195° C.

2. The process of claim 1 wherein the cyclopentadienyl sodium compound is methylcyclopentadienyl sodium.

3. The process of claim 1 wherein the solvent is a diethylene glycol dialkyl ether in which each of the alkyl groups contain from 1 to 10 carbon atoms.

4. The process of claim 1 wherein the solvent is employed in a concentration of from about 1 to 10 parts per part of sodium.

References Cited in the file of this patent

UNITED STATES PATENTS

| | | |
|---|---|---|
| 2,777,887 | Weinmayr | Jan. 15, 1957 |
| 2,813,134 | Johnson | Nov. 12, 1957 |
| 2,816,935 | Watson et al. | Dec. 17, 1957 |
| 2,848,506 | Breslow | Aug. 19, 1958 |

FOREIGN PATENTS

| | | |
|---|---|---|
| 924,029 | Germany | Feb. 24, 1955 |